United States Patent [19]

Leggett et al.

[11] Patent Number: 4,809,818

[45] Date of Patent: Mar. 7, 1989

[54] WHEELCHAIR LOCK DEVICE

[75] Inventors: Geary M. Leggett; Robert W. Perdue, both of Anderson, Calif.

[73] Assignee: Leggett, Perdue & MacCarthy, Sr., South El Monte, Calif.

[21] Appl. No.: 73,868

[22] Filed: Jul. 14, 1987

Related U.S. Application Data

[63] Continuation of Ser. No. 725,675, Apr. 22, 1985, abandoned.

[51] Int. Cl.⁴ .............................................. B60T 1/06
[52] U.S. Cl. .................................... 188/2 F; 280/42; 280/650; 297/D4
[58] Field of Search .................. 188/2 F; 280/42, 650, 280/657; 297/D4

[56] References Cited

U.S. PATENT DOCUMENTS

| 3,897,857 | 8/1975 | Rodaway | 188/2 F |
| 3,899,189 | 8/1975 | Watkins | 280/242 WC X |
| 4,322,093 | 3/1982 | Oho | 188/2 F X |
| 4,326,732 | 4/1982 | Gall et al. | 280/242 WC X |

FOREIGN PATENT DOCUMENTS

| 2532485 | 2/1977 | Fed. Rep. of Germany | 188/2 F |
| 2842570 | 4/1980 | Fed. Rep. of Germany | 280/289 WC |
| 2074106 | 10/1981 | United Kingdom | 280/650 |

Primary Examiner—Andres Kashnikow
Assistant Examiner—Matthew C. Graham
Attorney, Agent, or Firm—Jessup, Beecher & Slehofer

[57] ABSTRACT

A wheelchair locking device which attaches to both wheelchair hand brakes, thereby activating both brakes when one brake is activated, and which folds when used with a folding wheelchair.

4 Claims, 2 Drawing Sheets

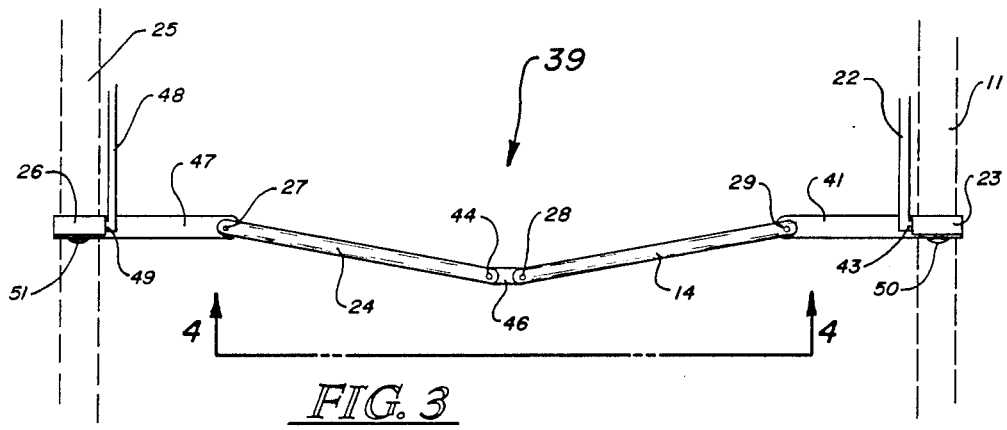
FIG. 3
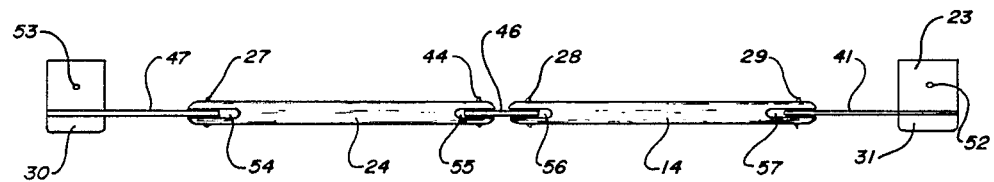
FIG. 4
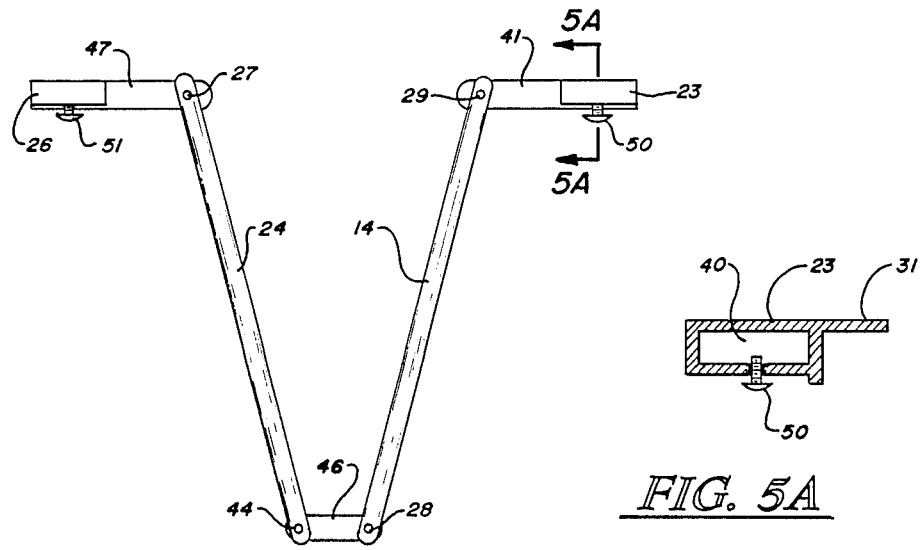
FIG. 5
FIG. 5A

WHEELCHAIR LOCK DEVICE

This application is a continuation of application Ser. No. 725,675, filed Apr. 22, 1985, now abandoned.

BACKGROUND OF THE INVENTION

1. Field of the Invention.

This invention relates generally to the area of aids for handicapped individuals, and more specifically to aids designed to make the operation of wheelchairs more responsive to the needs of handicapped persons.

2. Description of the Prior Art. In the past, inventors have designed wheelchairs for use by handicapped persons and have further designed various types of hand brakes which, when applied, limit the movement of one of the wheels of the wheelchair. None of the prior art of which applicant is aware has taught a wheelchair brake or an adapter for use in locking both brakes together by use of the lever associated with either individual wheel brake which includes the unique features relating to attachment and folding taught herein.

SUMMARY OF THE INVENTION

The present invention consists of a novel adapter for use with wheelchairs which is designed to enable the user of a wheelchair to lock or unlock both wheels of the wheelchair through the use of the brake lever associated with the left wheel or the brake lever associated with the right wheel of the wheelchair. In the present configuration, the present invention is designed for use with wheelchair brakes of the friction variety, which prevent a wheel from moving as a result of direct contact with the rubber outer rim of the wheel. The present invention includes two segments, each being attachable to one brake of the wheelchair and connected together by rods. In the present embodiment, the rod is constructed of several segments with pivot points and is designed for use with a folding wheelchair, the connecting rod being foldable with the wheelchair.

One of the objects of the present invention is to provide an adapter for use with wheelchair brakes which enables the operator to lock both wheels of the wheelchair through the use of either of the levers used in an individual braking system.

Another object of the present invention is to provide a wheelchair brake adapter designed to be easily attached to and/or removed from the braking system of a wheelchair, thereby enabling an individual to utilize the original individual-wheel braking system, or to utilize the dual braking system facilitated by this adapter.

Another object of the present invention is to provide a wheelchair braking adapter which, because of its unique design, folds when the wheelchair folds, thereby enabling permanent attachment to the existing brakes of a folding wheelchair.

A further object of the present invention is to provide a wheelchair braking adapter which, because of its unique attaching means, is incapable of being removed from the brakes until the wheelchair is folded, and it thereby increases the reliability of the adapter.

The foregoing objects, as well as other objects and benefits of the present invention, will become obvious in the following descriptions and claims.

BRIEF DESCRIPTION OF THE DRAWINGS

FIG. 3 is a front view showing the wheelchair brake adapter and its various parts, and showing its position with respect to the wheels of the wheelchair of FIG. 1.

FIG. 4 is a bottom view showing the construction of the wheelchair brake adapter.

FIG. 5 is a front view of the wheelchair brake adapter, showing it in a folded position as it appears when the wheelchair is folded.

FIG. 5A is a cross-sectional view of part of the wheelchair brake adapter taken along lines 5A—5A of FIG. 5.

DESCRIPTION OF THE PREFERRED EMBODIMENT

Figure 1:
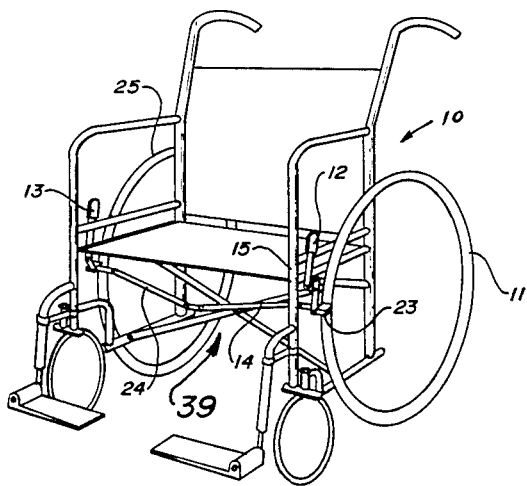
FIG. 1 is a perspective view showing a complete wheelchair.

FIG. 1 of the drawings shows a complete wheelchair 10 with dual braking structure 39 in place and attached to the brakes at each side of the wheelchair 10. As shown in FIG. 1, the dual braking structure 39 has pivot points which permit it to fold as the wheelchair 10 folds. The dual braking structure 39 is shown in a folded position in FIG. 5 of the drawings.

The wheelchair and wheelchair lock device are medially symmetrical, that is, if one were to bisect the wheelchair in a vertical plane transversly to the axis of the two wheels and midway between the 2 wheels, the left section would be a mirror image of the right section. For purposes of orientation, the components of the invention and the wheelchair will be described as left or right from the user's perspective who is sitting in the chair. The wheel 11 is the left wheel and the wheel 25 is the right wheel. Additionally, brake 22 is the left brake, with the left tongue 43 in combination with the left rod 14. The right brake is 48, the right rod is 24, and the right brake tongue is 49.

Figure 2:
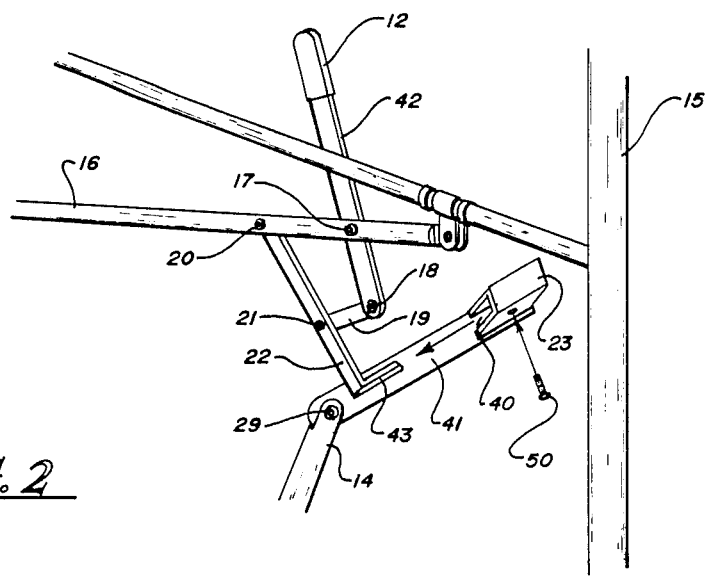
FIG. 2 is an expanded side view showing the brake used on the left wheel of the wheelchair shown in FIG. 1.

Physical construction of the dual braking structure 39 is shown in FIGS. 2, 3 and 4. FIGS. 2 and 3 specifically show how dual braking structure 39 is attached to brakes 22 and 48. FIG. 2 shows a standard wheelchair brake system consisting of a handle 42 with a grip 12 pivotally attached to brace 16 of wheelchair 10 and further pivotally attached to transfer rod 19. It further consists of brake 22 with tongue 43 which is pivotally attached to brace 16 and to transfer rod 19. When handle 42 is pulled toward rod 15, it pushes transfer rod 19 and brake 22 toward wheel 11 until tongue 43 contacts wheel 11. Adapter housing 23 is in the form of a tube of rectangular cross section (FIG. 5A), having a bore or cavity 40 therein for accepting the tongue 43 of brake 22. Screws 50 and 51 are utilized to secure tongues 43 and 49 in the holes, or cavities in adapter housings 23 and 26. Once tongue 43 has been inserted into hole 40 in adapter 23 and tongue 49 of brake 48 has been inserted into the hole, or cavity in adapter housing 26 and wheelchair 10 is unfolded to an open condition, dual braking structure 39 is held in position whether screws 50 and 51 are in place or not. As a result of their orientation, adapter housings 23 and 26 will not slip off of tongues 43 and 49 so long as the wheelchair 10 is in the open condition. This feature increases the integrity of dual braking structure 39.

All of the pivotal connections have linkages sufficiently tight so that whenever one of the brake handles is actuated, both adapter housing extensions, which service as the brake pads, make sufficient contact with the wheelchair wheels to lock or brake them.

FIG. 3 further shows the dual braking structure 39 with respect to wheels 11 and 25 of wheelchair 10. The basic structure of dual braking structure 39 consists of two rods 14 and 24, pivotally attached to center section 46 by pins 28 and 44, and further has adapter housings 23 and 26 with extension bars 41 and 47 pivotally attached to rods 14 and 24 by pivot pins 29 and 27 respectively. Adapter housings 23 and 26 have adapter extensions 30 and 31 which are designed specifically to contact wheels 25 and 11 respectively of wheelchair 10. The overall length of dual braking structure 39 is selected to accommodate a standard wheelchair width.

As is shown by FIG. 4, rods 14 and 24 have slots 54, 55, 56 and 57 to accommodate attaching center section 46 and extension bars 41 and 47 to them. Rods 14 and 24 therefore pivot with respect to center section 46.

FIG. 5 shows the dual braking structure 39 in a partially folded position. The use of center section 46, which is pivotally attached to both rods 14 and 24, allows rods 14 and 24 to be folded up against each other. This facilitates complete folding of wheelchair 10.

FIG. 5A shows the structure of adapter 23 and adapter extension 31. Adapter 23 is shown in FIG. 2 in position to slide over tongue 43 of brake 22 of wheelchair 10. As is shown by the arrow, when adapter extension 30 has been slid onto tongue 43 of brake 22, it can be held rigidly in place through tightening of screw 50.

While the foregoing descriptions have shown the preferred embodiment of applicant's invention at this time, applicant wishes to make it clear that, because of numerous and varied improvements and modifications will occur to those skilled in the art of building devices for the handicapped, it is applicant's intent not to be limited by any of the descriptions or drawings contained herein, but only by the claims which follow.

We claim:

1. A wheelchair dual locking device attached between the left tongue and right tongue of a foldable wheelchair having an individually operable left brake with a tongue and an individually operable right brake with a tongue, comprising:
   a left rod having a first end and a second end;
   a right rod having a first end and a second end;
   a center section pivotally attached at one end to said first end of said right rod and pivotally attached at the other end to said first end of said left rod so that said left and right rods fold substantially parallel to each other in the same plane during folding of said wheelchair;
   left attachment means comprising a left extension bar having one end pivotally attached to said second end of said left rod;
   the other end of said left extension bar having a left tubular adapter housing having a bore adapted to slip over and engage said tongue of said left brake;
   said left adapter housing including a left adapter extension extending transversely for engaging the wheelchair left wheel whenever either wheelchair brake handle is actuated;
   right attachment means comprising a right extension bar having one end pivotally attached to said second end of said right rod;
   the other end of said right extension bar having a right tubular adapter housing having a bore adapted to slip over and engage said tongue of said right brake;
   said right adapter housing including a right adapter extension extending transversely for engaging the wheelchair right wheel whenever either wheelchair brake handle is actuated;
   whereby said wheelchair dual locking mechanism is held in place while said wheelchair is in the unfolded and open position and can be removed when said wheelchair is in the folded and collapsed position.

2. The wheelchair locking mechanism as recited in claim 1 further comprising a screw means in said left adapter housing for securing the left brake tongue in said cavity of said left adapter housing.

3. The wheelchair locking mechanism as recited in claim 1 further comprising a screw means in said right adapter housing for securing the right brake tongue in said cavity of said right adapter housing.

4. The wheelchair as recited in claim 1 wherein all of said pivotal connections are sufficiently tight for allowing force to be transfered to both said adapter housing extensions whenever either wheelchair brake handle is actuated.

* * * * *